United States Patent
Maskey et al.

(10) Patent No.: US 8,769,009 B2
(45) Date of Patent: Jul. 1, 2014

(54) VIRTUAL COMMUNICATION TECHNIQUES

(75) Inventors: Sameer Maskey, New York, NY (US); Sara H. Basson, White Plains, NY (US); Dimitri Kanevsky, Ossining, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 13/030,268

(22) Filed: Feb. 18, 2011

(65) Prior Publication Data

US 2012/0215843 A1     Aug. 23, 2012

(51) Int. Cl.
*G06F 15/16*     (2006.01)

(52) U.S. Cl.
USPC ............ 709/204; 709/206; 709/224; 709/227

(58) Field of Classification Search
None
See application file for complete search history.

(56) References Cited

U.S. PATENT DOCUMENTS

| | | | |
|---|---|---|---|
| 4,965,763 A | 10/1990 | Zamora | |
| 6,236,968 B1 | 5/2001 | Kanevsky et al. | |
| 6,246,985 B1 | 6/2001 | Kanevsky et al. | |
| 6,293,874 B1 | 9/2001 | Armstrong | |
| 6,421,453 B1 | 7/2002 | Kanevsky et al. | |
| 6,442,519 B1 | 8/2002 | Kanevsky et al. | |
| 6,505,208 B1 | 1/2003 | Kanevsky et al. | |
| 6,529,902 B1 | 3/2003 | Kanevsky et al. | |
| 6,665,644 B1 | 12/2003 | Kanevsky et al. | |
| 6,792,339 B2 | 9/2004 | Basson et al. | |
| 6,965,773 B2 | 11/2005 | Basson et al. | |
| 6,975,991 B2 | 12/2005 | Basson et al. | |
| 7,266,430 B2 | 9/2007 | Basson et al. | |
| 7,395,206 B1 | 7/2008 | Irwin et al. | |
| 7,702,607 B2 | 4/2010 | Torge et al. | |
| 7,706,548 B2 | 4/2010 | Kanevsky et al. | |
| 7,716,056 B2 | 5/2010 | Weng et al. | |
| 7,904,297 B2 | 3/2011 | Mirkovic et al. | |
| 7,937,463 B2 | 5/2011 | Chadli | |
| 8,199,734 B2 * | 6/2012 | Sammarco | 370/338 |

(Continued)

FOREIGN PATENT DOCUMENTS

WO     2005/062200     7/2005

OTHER PUBLICATIONS

Lee et al., Implementation of Dialogue System for Intelligent Services Robots, International Conference on Control, Automation and Systems 2008, Oct. 14-17, 2008 in COEX, Seoul, Korea, pp. 2038-2042.

(Continued)

*Primary Examiner* — Rupal Dharia
*Assistant Examiner* — Van Kim T Nguyen
(74) *Attorney, Agent, or Firm* — Ryan, Mason & Lewis, LLP (57) ABSTRACT

Techniques for facilitating communication are provided. The techniques include using a machine-to-machine communication to facilitate communication between one or more human users of a communicator device and a compatible communicator device, wherein using the machine-to-machine communication to facilitate communication between one or more human users comprises initiating a machine-to-machine communication with a compatible communicator device if the device is within the geographic proximity, wherein the machine-to-machine communication incorporates one or more related items from a user profile of each device automatically extracted by the device initiating the machine-to-machine communication, and conducting the machine-to-machine communication in a manner in which the communication can be monitored by the one or more human users.

23 Claims, 5 Drawing Sheets

(56) References Cited

U.S. PATENT DOCUMENTS

| | | | |
|---|---|---|---|
| 2002/0111791 A1 | 8/2002 | Candelore | |
| 2005/0010597 A1 | 1/2005 | Potter et al. | |
| 2005/0021600 A1 | 1/2005 | Lago Santo et al. | |
| 2005/0154264 A1 | 7/2005 | Lecompte et al. | |
| 2005/0250552 A1* | 11/2005 | Eagle et al. | 455/567 |
| 2007/0005643 A1 | 1/2007 | Korman | |
| 2007/0250841 A1 | 10/2007 | Scahill et al. | |
| 2008/0082479 A1 | 4/2008 | Chang et al. | |
| 2008/0091546 A1 | 4/2008 | Kirovski et al. | |
| 2008/0134058 A1 | 6/2008 | Shen et al. | |
| 2008/0222402 A1 | 9/2008 | Connors et al. | |
| 2008/0248784 A1* | 10/2008 | Pan | 455/414.1 |
| 2009/0059786 A1* | 3/2009 | Budampati et al. | 370/230 |
| 2009/0099940 A1 | 4/2009 | Frederick et al. | |
| 2009/0195392 A1 | 8/2009 | Zalewski | |
| 2010/0022852 A1 | 1/2010 | Westerink et al. | |
| 2010/0083225 A1 | 4/2010 | Giat | |
| 2010/0086204 A1 | 4/2010 | Lessing | |
| 2010/0165947 A1 | 7/2010 | Taniuchi et al. | |
| 2010/0169073 A1 | 7/2010 | Almagro | |
| 2010/0174813 A1* | 7/2010 | Hildreth et al. | 709/224 |
| 2010/0185434 A1 | 7/2010 | Burvall et al. | |
| 2010/0199228 A1 | 8/2010 | Latta et al. | |
| 2010/0328078 A1* | 12/2010 | Light et al. | 340/573.1 |
| 2011/0023023 A1 | 1/2011 | Chatterjee | |
| 2011/0113086 A1* | 5/2011 | Long et al. | 709/203 |
| 2011/0172999 A1 | 7/2011 | Hakkani-Tur et al. | |
| 2011/0178803 A1 | 7/2011 | Petrushin | |
| 2011/0179180 A1* | 7/2011 | Schleifer et al. | 709/227 |
| 2011/0295856 A1 | 12/2011 | Roitblat et al. | |
| 2011/0307380 A1* | 12/2011 | Ido | 705/44 |
| 2012/0029308 A1 | 2/2012 | Paquet | |
| 2012/0047483 A1 | 2/2012 | Amit et al. | |
| 2012/0072451 A1 | 3/2012 | Merrifield et al. | |
| 2012/0115501 A1* | 5/2012 | Zheng | 455/456.1 |
| 2013/0173431 A1 | 7/2013 | Nations et al. | |

OTHER PUBLICATIONS

Li et al., A Dialog System for Comparative User Studies on Robot Verbal Behavior, the 15th IEEE International Symposium on Robot and Human Interactive Communication (RO-MAN06), Hatfield, UK, Sep. 6-8, 2006, pp. 129-134.

Natural Language Generation, http://en.wikipedia.org/wiki/Natural_language_generation, pp. 1-5, downloaded Feb. 1, 2012.

Natural Language Understanding, http://en.wikipedia.org/wiki/Natural_language_understanding, pp. 1-4, downloaded Feb. 1, 2012.

Sony Emotion Detector, http://www.bit-tech.net/news/gaming/2009/08/17/sony-patents-ps3-emotion-detector/1, pp. 1-3, downloaded Feb. 1, 2012.

Shimazu, ExpertClerk: A Conversational Case-Based Reasoning Tool for Developing Salesclerk Agents in E-Commerce Webshops, (Dec. 2002) Artificial Intelligence Review, Issue 3-4, pp. 223-244 [retrieved from http:// link.springer.com/article/10.1023/A:1020757023711#].

Andre et al. Presenting Through Performing: On the Use of Multiple Lifelike Characters in Knowledge-Based Presentation Systems, (Mar. 2001) Knowledge-Based Systems, vol. 14, Issues 1-2, pp. 3-13 [retrieved from http://www.sciencedirect.com/science/article/pii/S0950705100000964].

Dictionary.com. Dictionary.com Unabridged. Random House, Inc. http://dictionary.reference.com/browse/compendium (accessed: Aug. 15, 2013).

Nudd, Apple's "Get a Mac," the Complete Campaign Hodgman and Long, Ad Characters for the Ages, (Apr. 13, 2011) [retrieved from http://www.adweek.com/adfreak/apples-get-mac-complete-campaign-130552].

Dictionary.com. Dictionary.com Unabridged. Random House, Inc. http://dictionary.reference.com/browse/summary (accessed: Aug. 15, 2013).

Chai et al. Natural Language Sales Assistant—A Web-based Dialog System for Online Sales, (2001) Proceedings of IAAI-01, pp. 1-8 [retrieved from http://www.aaai.org/Papers/IAAI/2001/IAAI01-003.pdf].

Chai et al. A Conversational Interlace for Online Shopping, (2001) Proceedings of the First International Conference on Human Language Technology Research, pp. 1-4 [retrieved from http://dl.acm.org/citation.cfm?id=1072145].

Bartenstein, DialogEngines—Dialog Agents for Web-Based Self Service Consulting, (2005), Applications of Declarative Programming and Knowledge Management Lecture Notes in Computer Science, vol. 3392, pp. 269-277 [retrieved from http://link.springer.com/chapter/10.1007/11415763_18#].

Merriam-Webster's Collegiate Dictionary, 10th Ed. (1999), p. 877.

Prendinger et al., The Empathic Companion: A Character-Based Interface that Addresses Users' Affective States, (2005), Applied Artificial Intelligence, vol. 19, Iss. 3-4, pp. 267-285 [retrieved from http://www.miv.t.u-tokyo.ac.jp/papers/helmut-JAppliedAI05.pdf.

* cited by examiner

VIRTUAL COMMUNICATION TECHNIQUES

FIELD OF THE INVENTION

Embodiments of the invention generally relate to information technology, and, more particularly, to communication technology.

BACKGROUND OF THE INVENTION

Individuals are often co-located, and yet can be hesitant to initiate dialogue with others in close proximity. There is frequently no clear way to determine a priori whether one individual is interested in engaging in conversation, or if an individual shares interests with another individual.

There exist social networking tools that can enable participants to "pre-meet." For example, a traveler about to embark on a trip can identify others going on that same trip using a social networking site. A traveler can establish a priori whether he or she shares common interests with other travelers. This process, however, requires a level of planning that is not practical or even possible in many situations.

Similar obstacles can occur in many settings where people gather such as, for example, a bar or restaurant, where individuals may also want to engage with others.

SUMMARY OF THE INVENTION

Principles and embodiments of the invention provide techniques for virtual communication. An exemplary method (which may be computer-implemented) for facilitating communication, according to one aspect of the invention, can include steps of using a machine-to-machine communication to facilitate communication between one or more human users of a communicator device and a compatible communicator device, wherein using the machine-to-machine communication to facilitate communication between one or more human users comprises initiating a machine-to-machine communication with a compatible communicator device if the device is within the geographic proximity, wherein the machine-to-machine communication incorporates one or more related items from a user profile of each device automatically extracted by the device initiating the machine-to-machine communication, and conducting the machine-to-machine communication in a manner in which the communication can be monitored by the one or more human users.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include group communication techniques. As described herein, an example setting detailed throughout for illustration purposes includes a traveler travelling in the presence/company of other individuals. It should be appreciated that the techniques described in connection with one or more embodiments of the invention can similarly be implemented in other settings involving groups of individuals.

As such, one or more embodiments of the invention can include the use of a portable device (often referred to herein as a social communicator (SC)) that can communicate (for example, via voice) with other computers or devices. By way of example, computers, belonging to different travelers who sit opposite each other on a train, can communicate between themselves by voice in order to introduce their owners (that is, the travelers) and potentially facilitate their owners to socialize with each other. One or more embodiments of the invention enable computers to exchange information between themselves without being prompted to exchange information via an input text signal. In such an example, the travelers can hear the conversation between computers and subsequently opt to talk themselves. Additionally, in one or more embodiments of the invention, foreign travelers can have translations emitted from these devices.

As detailed herein, one or more embodiments of the invention include computers or devices that include a dialog system, speech recognition, speech synthesis and radio communication systems. It is to be appreciated by one skilled in the art that, in one or more embodiments of the invention, such systems as noted above can be used in standard implementations (for example, a network of devices can communicate with one another via a virtual network, a database comparison process can be carried out, etc.). The devices can, for example, understand human speech when people join audio conversation between computers, as well as have access to profiles of travelers who own similar devices, further assisting to initialize conversation between devices.

One or more embodiments of the invention include facilitating social interactions between individuals while increasing the likelihood that, for example, communication is occurring between individuals with common interests. The techniques described herein include using a social communicator (SC) that can communicate with other computers or devices in proximity. SCs can be embedded in devices such as, for example, computers, mobile phones and other mobile devices. As detailed herein, an SC has sensors that can identify whether a target device is in proximity and appears "available" (for example, not already engaged in conversation). In one or more embodiments of the invention, SCs can engage as many SCs and persons as a SC determines to be useful at any time.

Also, in one or more embodiments of the invention, an SC can maintain profiles of candidate devices that would potentially be of interest to a particular participant. By way of example, an SC can be primed to identify other users with an interest in sports, literature, movies, etc. In one or more embodiments of the invention, the target device is equipped with an SC as well, identifying areas/topics of interest so that a suitable match can potentially be established.

Additionally, in one or more embodiments of the invention, devices containing an SC can initiate conversation among themselves via data channel or via speech. With a data channel, the human owners of the SC devices can monitor the communication and determine when or whether they want to interject into the conversation. If the SC owners opt to communicate between themselves, the SC devices that have established the introduction can ultimately stop communicating or be shut down by the SC owners. In such an instance, the SCs identify that their owners have a sufficient number of words per minute (meaning that owners are engaged in a real conversation). In one or more embodiments of the invention, SCs can also understand meanings of conversations between owners and determine that the conversation is sufficient to allow the owners to talk between themselves. Also, in one or more embodiments of the invention, owners have the option to shut their SCs manually (for example, via speech commands).

Figure 1:
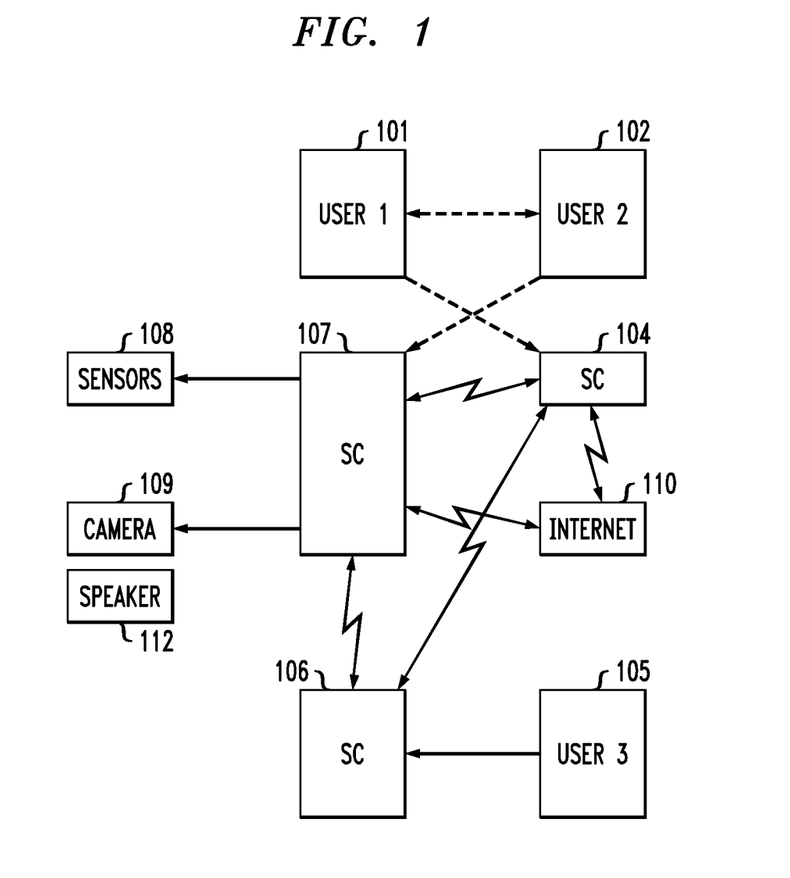
FIG. 1 is a diagram illustrating example architecture, according to an embodiment of the invention.

FIG. 1 is a diagram illustrating example architecture, according to an embodiment of the present invention. By way of illustration, FIG. 1 depicts a user (1) 101, a user (2) 102 and a user (3) 105, SC 104, SC 106 and SC 107, as well as sensors 108, a camera component 109, a speaker component 112 and an internet component 110.

As illustrated in FIG. 1, user 101 has social communicator 107, and user 102 has social communicator 104. Communicator 107 has sensors 108 as well as a camera 109 and speakers 112. Social Communicator 104 serves user 102 and can have similar sensors and components.

As detailed herein, in one or more embodiments of the invention, a social communicator (SC) can be small and portable, and reside on devices such as a mobile phone or laptop computer. SCs communicate initially between themselves, when their users are located within some pre-defined physical distance. For example, a user with an SC can be sitting in front of a user with an SC on a train. After some period of time, the users can also possibly interject into the conversation with the social communicators, if the users so choose. By way of example, a user identifies that the SC are communicating about a topic such as football, which is also of interest to the user. The user might then opt to interject into the conversation. Similarly, the second user can also take the initiative to interject into the conversation. As such, a number of scenarios can potentially exist. For example, in one, a user interjects him or herself into a conversation of SCs and talks to the SCs until other users enter into the conversation. When SCs determine, then, that the conversation between owners is sufficient, the SCs can gradually shut themselves down. In one or more embodiments of the invention, SCs do not shut themselves down until owners start to speak also. In other embodiments of the invention, the SCs can speak between themselves, provide information to facilitate interested owners in entering into a conversation, and shut themselves down even if owners have not started to speak.

Gradually, the social communicators can remove themselves from the communication and allow the users to communicate among themselves. For example, such a situation can involve longer pauses between SCs to speak until they stop completely. SCs can, however, come back into a conversation (for example, if owners make very long pauses, if owner manually queries SC to speak again, etc.). All scenarios are possible, and in one or more embodiments of the invention, such parameters can be programmed in the devices by owners in advance. Such an example scenario can occur, for instance, with more than two users, as demonstrated in FIG. 1 with user 105, who has SC 106.

A camera 109 is used to enable the SC to evaluate the surrounding environment and identify other users that may be amenable to engage in conversation. The camera can include a system that recognizes visual characteristics of persons in the vicinity that may point to social characteristics such as, for example, age, gender, religious symbols, owner attentive state (sleep, tired, bored, etc.), etc.

As further depicted in FIG. 1, all of the components can be connected to the internet (component 110). The internet connection can be used to identify history or background information about users so that the online connection can potentially facilitate conversation. The internet capabilities can also facilitate the addition of potentially relevant details so that if users are, for example, talking about football, additional updates from the internet can be gleaned. For example, a user can speak about football and the system identifies the discussion about football and can further provide additional information to the conversation (for example, based on information derived from internet updates on that topic).

Figure 2:
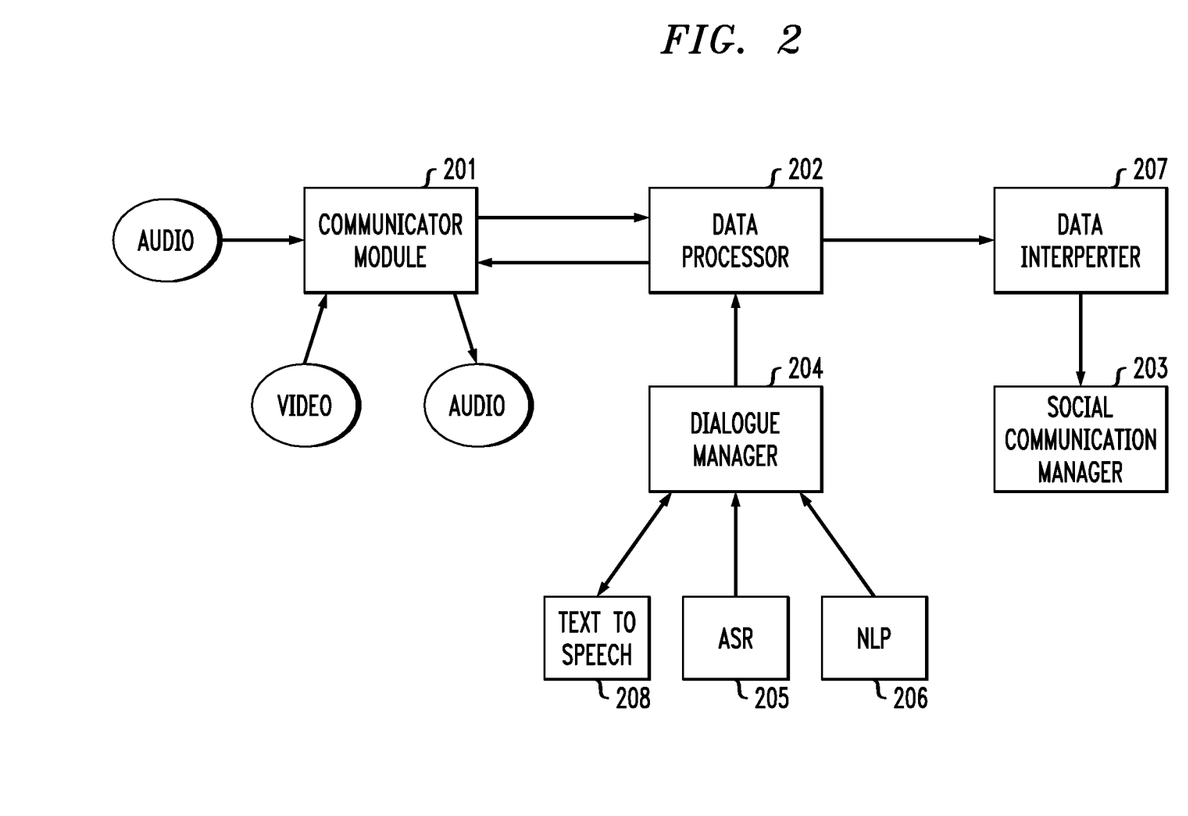
FIG. 2 is a diagram illustrating social communicator architecture, according to an embodiment of the present invention.

FIG. 2 is a diagram illustrating social communicator architecture, according to an embodiment of the present invention. By way of illustration, FIG. 2 depicts the following components and modules. Communication module 201 can obtain audio and visual information as well as produce audio information. Data processor module 202 processes data (for example, receives and sends information) in connection with the communication module 201, the data interpreter module 207 and the dialogue manager module 204.

Data interpreter module 207 operates on data from the data processor and sends information to the social communication manager module 203. The social communicator manager module 203 determines what kind of dialogue can potentially be preferentially initiated, based on what topics, such as sports, literature, movies, etc., might be engaging between users. Additionally, the social communicator manager module 203 operates with a range of information, such as environment information, user profile, etc. to determine a potential dialogue topic and when it may be appropriate to launch a conversation. Such capabilities can utilize different factors such as, for example, user profile(s), analysis of user characteristics, analysis of environment, etc. In one or more embodiments of the invention, the system can be programmed to facilitate starting a conversation if certain circumstances are present (for example, another person sits near). SCs compare profiles and identify common interests that also can be an impetus to trigger a conversation (for example, an owner can program his/her SC to talk to a medical doctor if the medical doctor sits near so that the owner may get informal advice).

As also depicted in FIG. 2, the dialogue manager module 204 conducts a conversation (with SCs and/or people) using, for example, a text-to-speech synthesis module 208, an automatic speech recognition (ASR) module 205, and/or a natural language processing (NLP) module 206.

Figure 3:
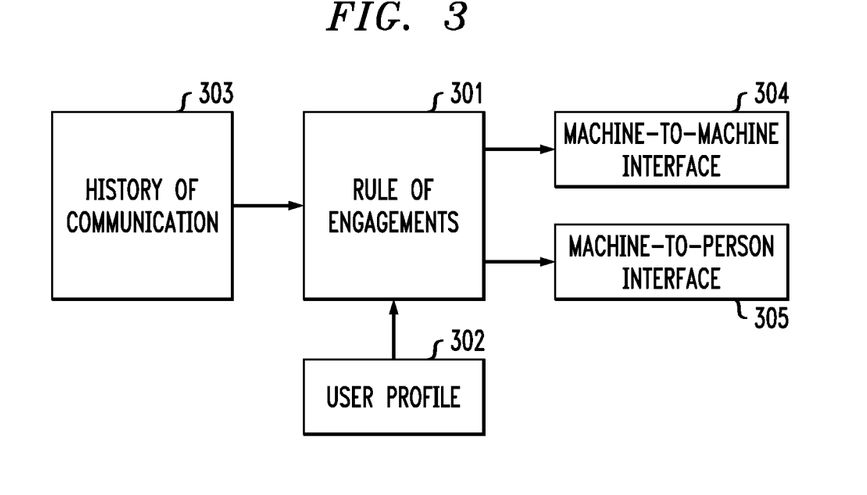
FIG. 3 is a diagram illustrating social communication manager architecture, according to an embodiment of the present invention.

FIG. 3 is a diagram illustrating social communication manager architecture, according to an embodiment of the present invention. By way of illustration, FIG. 3 depicts components of a social communication manager module (such as, for example, module 203 in FIG. 2). A rules of engagement module 301 is connected to a user profile component 302, along with history of communication component 303. The rules of engagement module 301 determines the composition of a machine-machine interface 304 as well as a machine-person interface 305.

Figure 4:
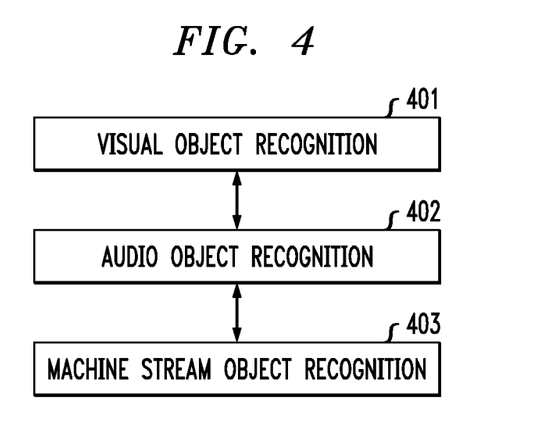
FIG. 4 is a diagram illustrating data interpreter architecture, according to an embodiment of the present invention.

FIG. 4 is a diagram illustrating data interpreter architecture, according to an embodiment of the present invention. By way of illustration, FIG. 4 depicts a visual object recognition module 401, an audio object recognition module 402 and a machine stream object recognition module 403. A visual object recognition module 401 is used to recognize surrounding objects. Similarly, the audio object recognition module 402 is used to determine what is happening in the surrounding audio environment (for example, ambient noise, existing conversations that might be going on, etc.).

A data interpreter module (such as, for example, module 207 in FIG. 2) sends a data stream between machines (for example, via audio and binary information). After two machines establish binary connection, the machines can decide whether to communicate via audio/text information. In one or more embodiments of the invention, if the machine determines that the conversation was heard by owners, the machine will speak/communicate aloud. If the machine detects that owner looks at the computer/laptop, the machine can create a chat window on the screen and communicate via text so that owner can watch the conversation (useful, especially, for owners who do not hear well or wish for privacy; this can be indicated in an owner's profile).

The data interpreter module can also determine that if the communication is binary, it is occurring between machines only. If audio information is detected, the data interpreter module can provide the audio to another node to interpret (that is, the audio object recognition module (402)).

Figure 5:
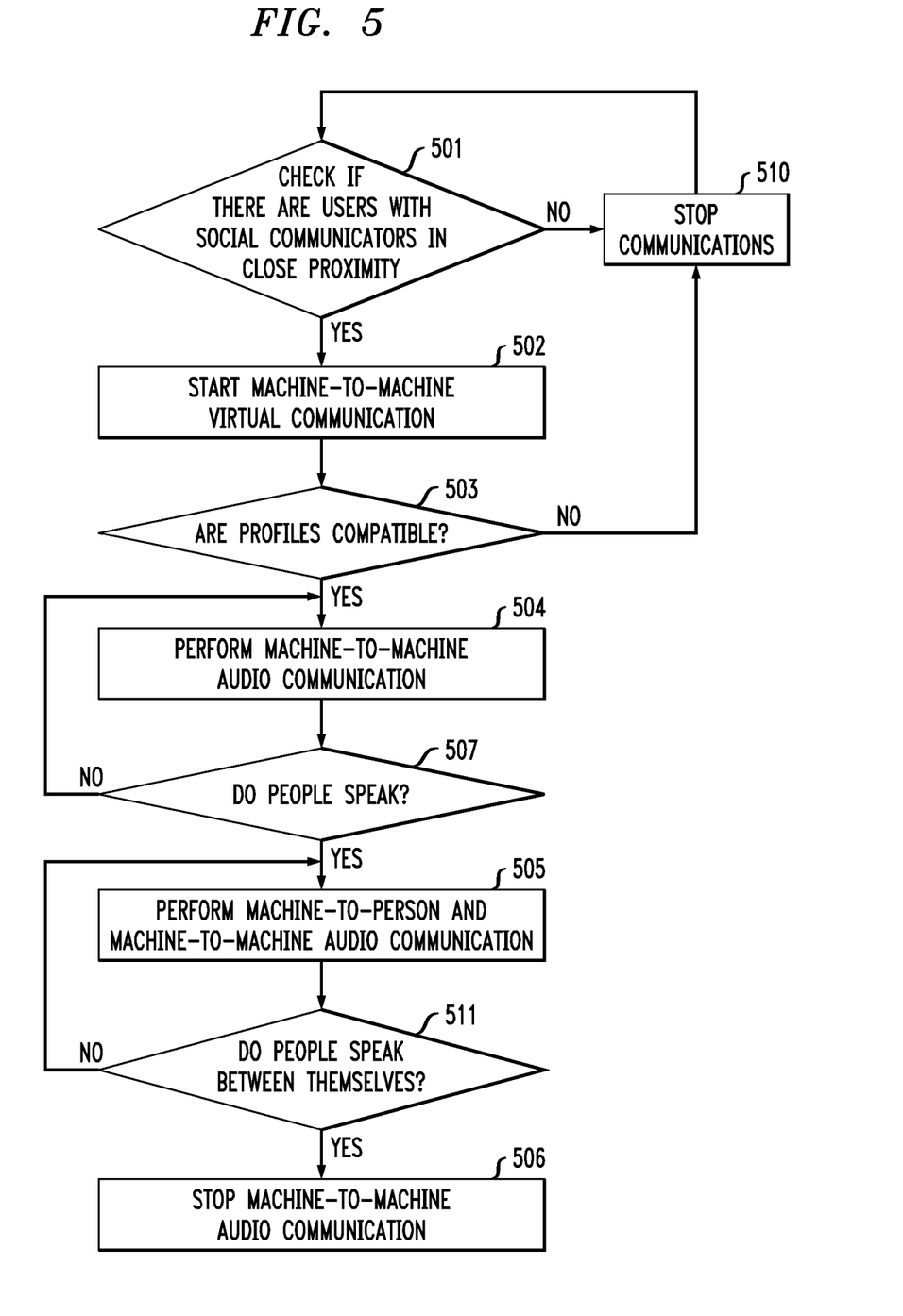
FIG. 5 is a flow diagram illustrating techniques for communication, according to an embodiment of the present invention.

FIG. 5 is a flow diagram illustrating techniques for communication, according to an embodiment of the present invention. Step 501 includes determining if there is a Social Communicator (SC) in close/reasonable proximity (for example, within a range wherein a conversation can take place without interfering with others nearby). If yes (that is, another SC is determined to be in close proximity) (and, for example, there is a match in user profiles and other instructions that are received from users), step 502 includes starting a machine-to-machine virtual communication. If no (that is, no SC is determined to be in close proximity), step 510 includes stopping any communication and continuing to monitor if a SC comes into proximity.

Step 503 includes determining if profiles of the SCs in close proximity are compatible. If the profiles are not compatible, the techniques return back to step 510 (stop communication). If the profiles are compatible, step 504 includes performing a machine-to-machine communication. Step 507 includes determining if people are speaking. If people are not speaking, the techniques continue with the machine-to-machine communication (in step 504). If people are speaking, then step 505 includes performing machine-to-person and machine-to-machine audio communications. Additionally, step 511 includes determining if people (that is, the users of the SCs) speak between themselves. If the people are not speaking between themselves, the techniques return to step 505. If the people are speaking between themselves, step 506 includes stopping the machine-to-machine audio communication. Further, one or more embodiments of the invention include continuing to check and monitor the nearby surroundings for SCs and carrying out the steps detailed above.

Figure 6:
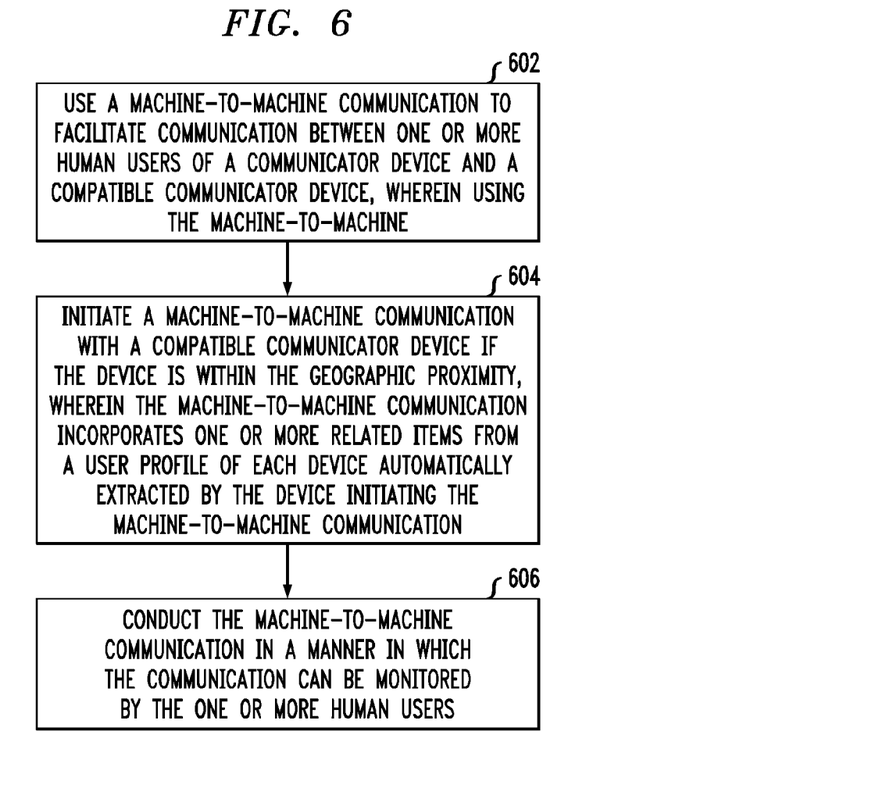
FIG. 6 is a flow diagram illustrating techniques for facilitating communication, according to an embodiment of the invention.

FIG. 6 is a flow diagram illustrating techniques for facilitating communication, according to an embodiment of the present invention. Step 602 includes using a machine-to-machine communication to facilitate communication between one or more human users of a communicator device and a compatible communicator device. Using the machine-to-machine communication to facilitate communication between one or more human users includes steps 604 and 606. Step 604 includes initiating a machine-to-machine communication with a compatible communicator device if the device is within the geographic proximity, wherein the machine-to-machine communication incorporates one or more related items from a user profile of each device automatically extracted by the device initiating the machine-to-machine communication. Step 606 includes conducting the machine-to-machine communication in a manner in which the communication can be monitored by the one or more human users. These steps can be carried out, for example, using a dialogue manager module, a data interpreter module, and/or a social communicator manager module.

The techniques depicted in FIG. 6 also include determining, via a communicator device, if there are one or more compatible communicator devices within a geographic proximity. Additionally, one or more embodiments of the invention include determining if a user profile of a communicator device within the geographic proximity is compatible with a user profile the communicator device making the determination. These steps can be carried out, for example, using a social communicator manager module.

Also, the techniques depicted in FIG. 6 include initiating a machine-to-machine communication with a compatible communicator device if the device is within the geographic proximity. This step can be carried out, for example, using a dialogue manager module. Initiating a machine-to-machine communication with a compatible communicator device if the device is within the geographic proximity can include enabling the devices to exchange information between themselves without being prompted to exchange information (for example, via an input text signal). Additionally, initiating a machine-to-machine communication with a compatible communicator device can include initiating the machine-to-machine communication via a data channel and/or speech. Conducting the machine-to-machine communication in a manner in which the communication can be monitored by the human users includes using the data channel to facilitate a user monitoring the communication to determine whether the user wants to interject into the communication.

Further, the machine-to-machine communication can include a multimedia communication (for example, audio, visual and/or text) between two or more communicator devices based on profile content of the device user (including, for example, interests), environment, etc. The device multimedia communication is based on the characteristics of the owners of the devices (for example, representing the owners as avatars). The characteristics can be represented by profiles, user behavior, social network status, etc.

The techniques depicted in FIG. 6 also include stopping the machine-to-machine communication if it is determined that the human users are communicating. Stopping the machine-to-machine communication if it is determined that the human users are communicating can be performed automatically or manually via the users. Further, determining that the human users are communication includes using audio sensors. The techniques depicted in FIG. 6 can additionally include initiating a hybrid communication between one or more communication devices and one or more human users if it is determined that the human users are communicating.

One or more embodiments of the invention also include providing translations (emitted from the SC) of at least one of verbal communication and textual communication. Further, the techniques depicted in FIG. 6 can include maintaining a database of profiles from candidate communication devices (for example, profiles of devices that would potentially be of interest to a particular participant), as well as alerting a user based on biometric information of the user.

The techniques depicted in FIG. 6 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a communication information module, a data processor module, a dialogue manager module, a data interpreter module and a social communicator manager module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, as detailed herein, one or more embodiments of the invention include a communicator device apparatus for facilitating communication. The apparatus includes a communication information module, wherein the communication module sends and receives communication information (for example, audio and visual information), a data processor module, wherein the data processor module processes data to and from the communication information module, a dialogue manager module, wherein the dialogue manager module performs a communication via providing input to the data processor module, a data interpreter module, wherein the data interpreter module operates on data received from the data processor module, and a social communicator manager module, wherein the social communicator manager module receives information from the data interpreter module and determines if a machine-to-machine communication can be initiated with a compatible communicator device within a geographic proximity.

The dialogue manager module can further include a text-to-speech synthesis module, an automatic speech recognition module, and a natural language processing module. Also, the data interpreter module can further include a visual object recognition module, an audio object recognition module and a machine stream object recognition module.

As described herein, the data interpreter module sends a data stream between two or more machines (for example, via audio and binary information). Also, the social communicator manager module operates with a range of information (such as, for example, environment information, user profile, etc.) to determine a potential dialogue topic. The social communicator manager module can also include a rules of engagement module, a user profile module, and a history of communication module, wherein the rules of engagement module determines the composition of a machine-machine interface and a machine-person interface.

The apparatus can additionally include sensors that identify whether a target device is within the geographic proximity (and, for example, appears "available"), as well as a camera used to enable the communicator device to evaluate a surrounding environment (for example, to identify other users that may be amenable to engage in conversation). Further, as described herein, the communicator device apparatus can be embedded in a computer, a mobile device, etc., and can also be connected to the interne.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
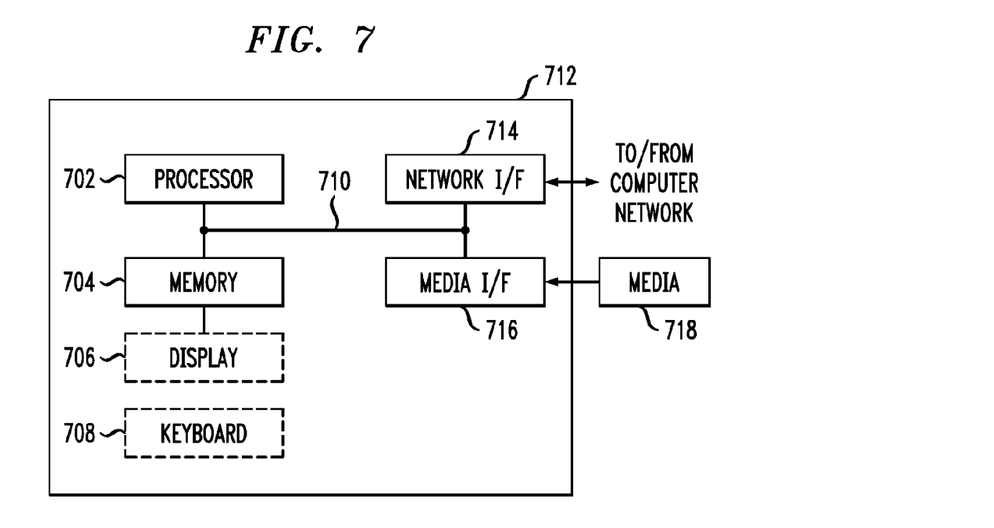
FIG. 7 is a system diagram of an exemplary computer system on which at least one embodiment of the invention can be implemented.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIGS. 1-4. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, enabling computers to exchange information between themselves without being prompted to exchange information via an input text signal.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for facilitating communication, wherein the method comprises:

using a machine-to-machine communication to facilitate communication between one or more human users of a communicator device and one or more human users of a compatible communicator device, wherein using the machine-to-machine communication to facilitate communication between the human users comprises:

initiating a machine-to-machine communication with a compatible communicator device if the compatible communicator device is within the geographic proximity, wherein the machine-to-machine communication incorporates one or more related items from a user profile of each device automatically extracted by the device initiating the machine-to-machine communication; and conducting the machine-to-machine communication in a manner in which the communication can be monitored by the human users, wherein said machine-to-machine communication is conducted aloud so as to be audible to the human users, and wherein said machine-to-machine communication is conducted without being prompted to exchange information via an input; and incrementally stopping the machine-to-machine communication upon determining that the human users are communicating, wherein said incrementally stopping the machine-to-machine communication comprises conducting the machine-to-machine communication with pre-determined multiple increments of non-communication that increase in duration length until the machine-to-machine communication reaches a pre-determined stopping point, and wherein said determining comprises identifying audible communication between the human users, via an audio sensor, that comprises a given number of words per minute.

2. The method of claim 1, further comprising determining, via a communicator device, if there are one or more compatible communicator devices within a geographic proximity.

3. The method of claim 1, further comprising determining if a user profile of a communicator device within the geographic proximity is compatible with a user profile the communicator device making the determination.

4. The method of claim 1, wherein initiating a machine-to-machine communication with a compatible communicator device if the device is within the geographic proximity comprises enabling the devices to exchange information between themselves without being prompted to exchange information.

5. The method of claim 1, wherein initiating a machine-to-machine communication with a compatible communicator device if the device is within the geographic proximity comprises initiating the machine-to-machine communication via at least one of a data channel and speech.

6. The method of claim 5, wherein conducting the machine-to-machine communication in a manner in which the communication can be monitored by the human users comprises using the data channel to facilitate a user monitoring the communication to determine whether the user wants to interject into the machine-to-machine communication.

7. The method of claim 1, wherein the machine-to-machine communication comprises a multimedia communication between two or more communicator devices based on at least one of profile content of the device user and environment.

8. The method of claim 1, further comprising initiating a hybrid communication between one or more communication devices and one or more human users if it is determined that the human users are communicating.

9. The method of claim 1, further comprising providing one or more translations of at least one of verbal communication and textual communication.

10. The method of claim 1, further comprising maintaining a database of profiles from candidate communication devices.

11. The method of claim 1, further comprising alerting a user based on biometric information of the user.

12. The method of claim 1, further comprising providing a system, wherein the system comprises one or more distinct software modules, each of the one or more distinct software modules being embodied on a tangible computer-readable recordable storage medium, and wherein the one or more distinct software modules comprise a communication information module, a data processor module, a dialogue manager module, a data interpreter module and a social communicator manager module executing on a hardware processor.

13. A communicator device apparatus for facilitating communication, comprising:
   a communication information module, wherein the communication module sends and receives communication information;
   a data processor module, wherein the data processor module processes data to and from the communication information module;
   a dialogue manager module, wherein the dialogue manager module performs a machine-to-machine communication via providing input to the data processor module, wherein said machine-to-machine communication is conducted aloud so as to be audible to human users and includes discussion of a topic determined by analysis of a profile of a human user that corresponds to each machine in the machine-to-machine communication;
   a data interpreter module, wherein the data interpreter module operates on data received from the data processor module;
   a social communicator manager module, wherein the social communicator manager module receives information from the data interpreter module and determines if a machine-to-machine communication can be initiated with a compatible communicator device within a geographic proximity; and
   one or more audio sensors, wherein the one or more audio sensors (i) facilitate determining that the human users are communicating, and (ii) facilitate incrementally stopping the machine-to-machine communication upon determining that the human users are communicating, wherein said incrementally stopping the machine-to-machine communication comprises conducting the machine-to-machine communication, via the dialogue manager module, with pre-determined multiple increments of non-communication that increase in duration length until the machine-to-machine communication reaches a pre-determined stopping point, and wherein said determining comprises identifying audible communication between the human users, via the one or more audio sensors, that comprises a given number of words per minute.

14. The apparatus of claim 13, wherein the dialogue manager module further comprises a text-to-speech synthesis module, an automatic speech recognition module, and a natural language processing module.

15. The apparatus of claim 13, wherein the data interpreter module further comprises a visual object recognition module, an audio object recognition module and a machine stream object recognition module.

16. The apparatus of claim 13, wherein the social communicator manager module operates with a range of information to determine a potential dialogue topic.

17. The apparatus of claim 13, wherein the social communicator manager module comprises a rules of engagement module, a user profile module, and a history of communication module, wherein the rules of engagement module determines the composition of a machine-machine interface and a machine-person interface.

18. The apparatus of claim 13, further comprising one or more sensors that identify whether a target device is within the geographic proximity.

19. The apparatus of claim 13, further comprising a camera, wherein the camera is used to enable the communicator device to evaluate a surrounding environment.

20. A computer program product comprising a tangible computer readable recordable storage memory device including computer useable program code for facilitating communication, the computer program product including:
   computer useable program code for using a machine-to-machine communication to facilitate communication between one or more human users of a communicator device and one or more human users of a compatible communicator device, wherein using the machine-to-machine communication to facilitate communication between the human users comprises:
      computer useable program code for initiating a machine-to-machine communication with a compatible communicator device if the compatible communicator device is within the geographic proximity, wherein the machine-to-machine communication incorporates one or more related items from a user profile of each device automatically extracted by the device initiating the machine-to-machine communication; and
      computer useable program code for conducting the machine-to-machine communication in a manner in which the communication can be monitored by the human users, wherein said machine-to-machine communication is conducted aloud so as to be audible to the human users, and wherein said machine-to-machine communication is conducted without being prompted to exchange information via an input; and
   computer useable program code for incrementally stopping the machine-to-machine communication upon determining that the human users are communicating, wherein said incrementally stopping the machine-to-machine communication comprises conducting the machine-to-machine communication with pre-determined multiple increments of non-communication that increase in duration length until the machine-to-machine communication reaches a pre-determined stopping point, and wherein said determining comprises identifying audible communication between the human users, via an audio sensor, that comprises a given number of words per minute.

21. The computer program product of claim 20, further comprising:
    computer useable program code for determining, via a communicator device, if there are one or more compatible communicator devices within a geographic proximity; and
    computer useable program code for determining if a user profile of a communicator device within the geographic proximity is compatible with a user profile the communicator device making the determination.

22. A system for facilitating communication, comprising:
    a memory; and
    at least one processor coupled to the memory and operative to:
    use a machine-to-machine communication to facilitate communication between one or more human users of a communicator device and one or more human users of a compatible communicator device, wherein in using the machine-to-machine communication to facilitate communication between the human users, the at least one processor coupled to the memory and operative to:
        initiate a machine-to-machine communication with a compatible communicator device if the compatible communicator device is within the geographic proximity, wherein the machine-to-machine communication incorporates one or more related items from a user profile of each device automatically extracted by the device initiating the machine-to-machine communication; and
        conduct the machine-to-machine communication in a manner in which the communication can be monitored by the human users, wherein said machine-to-machine communication is conducted aloud so as to be audible to the human users, and wherein said machine-to-machine communication is conducted without being prompted to exchange information via an input; and
    incrementally stop the machine-to-machine communication upon determining that the human users are communicating, wherein said incrementally stopping the machine-to-machine communication comprises conducting the machine-to-machine communication with pre-determined multiple increments of non-communication that increase in duration length until the machine-to-machine communication reaches a pre-determined stopping point, and wherein said determining comprises identifying audible communication between the human users, via an audio sensor, that comprises a given number of words per minute.

23. The system of claim 22, wherein the at least one processor coupled to the memory is further operative to:
    determine, via a communicator device, if there are one or more compatible communicator devices within a geographic proximity; and
    determine if a user profile of a communicator device within the geographic proximity is compatible with a user profile the communicator device making the determination.

* * * * *